(12) United States Patent
Wang et al.

(10) Patent No.: US 12,022,540 B2
(45) Date of Patent: Jun. 25, 2024

(54) SIDELINK CAPABILITY INFORMATION TRANSMISSION AND SECURITY BETWEEN PEER TERMINALS

(71) Applicant: ZTE Corporation, Shenzhen (CN)

(72) Inventors: Mengzhen Wang, Shenzhen (CN); Lin Chen, Shenzhen (CN); Boyuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 171 days.

(21) Appl. No.: 17/672,290

(22) Filed: Feb. 15, 2022

(65) Prior Publication Data

US 2022/0174763 A1 Jun. 2, 2022

Related U.S. Application Data

(63) Continuation of application No. PCT/CN2019/100695, filed on Aug. 15, 2019.

(51) Int. Cl.
*H04W 76/14* (2018.01)
*H04W 8/24* (2009.01)

(52) U.S. Cl.
CPC ............. *H04W 76/14* (2018.02); *H04W 8/24* (2013.01)

(58) Field of Classification Search
CPC ..... G06F 21/64; H04B 17/309; H04B 17/346; H04B 17/347; H04L 9/0822; H04L 63/12;
(Continued)

(56) References Cited

U.S. PATENT DOCUMENTS 10,904,787 B2 * 1/2021 Pan ................... H04W 28/0268
2009/0121021 A1 * 5/2009 Wang ................ H04W 52/0254
235/439
(Continued)

FOREIGN PATENT DOCUMENTS

CN 101047892 A 10/2007
CN 103067563 A 4/2013
(Continued)

OTHER PUBLICATIONS

Chinese Office Action with English translation regarding 201980099378.2 dated Dec. 2, 2022.
(Continued)

*Primary Examiner* — Thomas R Cairns
(74) *Attorney, Agent, or Firm* — Crowell & Moring LLP

(57) ABSTRACT

Methods, systems, and devices related to digital wireless communication, and more specifically, to techniques related to transmitting sidelink capability and security information between peer terminals. In one exemplary aspect, a method for wireless communication includes transmitting, by the first terminal, capability information associated with the first terminal to the second terminal based on a triggering event, the capability information associated with the first terminal relating to a capability of the first terminal to directly communicate with a second terminal. In another exemplary aspect, a method for wireless communication includes receiving information associated with a first terminal from the first terminal, the capability information associated with the first terminal relating to a capability of the first terminal to directly communicate with the second terminal. The method also includes determining transmission parameters for unicast communication with the first terminal.

14 Claims, 10 Drawing Sheets

(58) Field of Classification Search
CPC .... H04L 43/06; H04W 4/06; H04W 4/40–48;
H04W 8/005; H04W 8/24; H04W
12/0471; H04W 12/10; H04W
12/102–106; H04W 24/10; H04W 76/14;
H04W 88/04; H04W 92/18; H04W 24/02;
H04W 36/00; H04W 36/0083; H04W
36/0088; H04W 40/24; H04W 52/365;
H04W 60/06; H04W 72/30; H04W 72/54;
H04W 76/40; H04W 84/18; H04M
1/72406
See application file for complete search history.

(56) References Cited

U.S. PATENT DOCUMENTS

| | | | | |
|---|---|---|---|---|
| 2011/0310844 | A1* | 12/2011 | Rexhepi | H04W 36/0066 455/436 |
| 2018/0368018 | A1* | 12/2018 | Kim | H04L 69/08 |
| 2019/0037621 | A1* | 1/2019 | Feng | H04W 28/0278 |
| 2019/0223231 | A1 | 7/2019 | Muraoka et al. | |
| 2020/0314928 | A1* | 10/2020 | Kang | H04W 76/14 |
| 2020/0344574 | A1* | 10/2020 | Park | H04L 1/0072 |
| 2021/0315033 | A1* | 10/2021 | Zhao | H04W 76/14 |

FOREIGN PATENT DOCUMENTS

| | | |
|---|---|---|
| CN | 103636278 A | 3/2014 |
| CN | 104284299 A | 1/2015 |
| CN | 107995605 A | 5/2018 |
| CN | 108307389 A | 7/2018 |
| CN | 108702616 A | 10/2018 |
| CN | 109429188 A | 3/2019 |
| CN | 109845331 A | 6/2019 |
| WO | WO2007102546 A1 | 9/2007 |
| WO | WO2019061180 A1 | 4/2019 |
| WO | WO2019139689 | 7/2019 |

OTHER PUBLICATIONS

Vivo, "Sidelink unicast procedures in NR," 3GPP TSG-RAN WG2 Meeting #104, R2-1817108 (Revision of R2-1813921), Nov. 2, 2018.
Indian First Examination Report regarding 202217006855 dated Oct. 20, 2022, 8 pages.
International Search Report and Written Opinion of the International Searching Authority regarding PCT/CN2019/100695 dated Apr. 14, 2020, 7 pages.
Supplementary European Search Report regarding EP 19 94 1311 dated Jul. 5, 2022, 8 pages.
Oppo, "Discussion on PCS-RRC for unicast," 3GPP Draft; R2-1903211—Discussion on PC5-RRC for Unicast, 3rd Generation Partnership Project (3GPP), Mobile Competence Centr, Sophia-Antipolis Cedex; France, vol. RAN WG2, no. Xi'an, China; Apr. 8, 2019-Apr. 12, 2019, Apr. 6, 2019, Retrieved from the Internet: http://www.3gpp.org/ftp/Meetings%.
"3rd Generation Partnership Project; 1-3,5-9,Technical Specification Group Services and 13-15 System Aspects; Architecture enhancements for 5G System (SGS) to support Vehicle-to-Everything (V2X) services (Release 16)", 3GPP Draft; 23287-110-RM, 3rd Generation Partnership Project (3GPP), Mobile Competence Centre; 650, Route Des Lucioles; F-06921 Sophia-Antipolis Cedex; France vol. SA WG2, Jul. 12, 2019, Retrieved from the Internet: http://www.3gpp.org/ftp/tsg_sa/WG2_Arch/Latest_SA2_Specs/Latest_draft_S2_Specs/23287-110.zip.
3rd Generation Partnership Project; 1-15 Technical Specification Group Services and System Aspects; Study on architecture enhancements for EPS and 5G System to support advanced V2X services, 3rd Generation Partnership Project (3GPP), Mobile Competence Centre; 650, Route Des Lucioles; F-06921 Sophia-Antipolis Cedex; France Dec. 5, 2018, Retrieved from the Internet: http://www.3gpp.org/ftp/tsg%5Fsa/WG2%5FArch/Latest%5FSA2%5FSpecs/Latest%5Fdraft%5FS2%5FSpecs/23786%2DI00%2Ezip.
LG Electronics: "Study on NR V2X", 1-15 3GPP Draft; RP-190225 SR for NR V2X SI, 3rd Generation Partnership Project (3GPP), Mobile Competence Centre; Sophia-Antipolis Cedex; France vol. TSG RAN, no. Shenzhen, China; Mar. 18, 2019-Mar. 21, 2019, Mar. 11, 2019, Retrieved from the Internet: http://www.3gpp.org/tsg%5Fran/TSG%5FRAN/TSGR%5F83/Docs/RP%2DI90225%2Ezip.
China National Intellectual Property Administration Notification to Complete Formalities of Registration with English translation regarding Application No. 201980099378.2 dated May 30, 2023.
European Patent Office Communication pursuant to Article 94(3) EPC regarding Application No. 19 941 311.3 dated Oct. 11, 2023.
Korean Office Action with English summary of the Office Action regarding 103986143 dated Nov. 19, 2023, 7 pages.
3$^{rd}$ Generation Partnership Project, "Technical Specification Group Services and System Aspects; Study on architecture enhancements for EPS and 5G System to support advanced V2X services," (Release 16), 3GPP TR 23.786 V0.10.0 (Dec. 2018), Technical Report, 3GPP, 5G, Architecture, EPS, V2X services, 650 Route des Lucioles—Sophia Antipolis, Valbonne, France, 118 pages.
European Patent Office Communication regarding 19 941 311.3 dated Apr. 9, 2024, 3 pages.

* cited by examiner

SIDELINK CAPABILITY INFORMATION TRANSMISSION AND SECURITY BETWEEN PEER TERMINALS

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to transmitting sidelink capability information and security information between terminals.

In one exemplary aspect, a method for wireless communication includes transmitting, by the first terminal, capability information associated with the first terminal to the second terminal based on a triggering event, the capability information associated with the first terminal relating to a capability of the first terminal to directly communicate with a second terminal.

In another exemplary aspect, a method for wireless communication includes receiving, by a second terminal, capability information associated with a first terminal from the first terminal, the capability information associated with the first terminal relating to a capability of the first terminal to directly communicate with the second terminal. The method also includes determining, by the second terminal, transmission parameters for unicast communication with the first terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: transmitting, by the first terminal, capability information associated with the first terminal to the second terminal based on a triggering event, the capability information associated with the first terminal relating to a capability of the first terminal to directly communicate with a second terminal.

2. The solution of clause 1, further comprising: receiving, by the first terminal, a direct communication request message from the second terminal indicating a request to establish a unicast link between the first terminal and the second terminal; and transmitting, by the first terminal, a direct communication acceptance message to the second terminal indicating an acceptance of establishing the unicast link between the first terminal and the second terminal, wherein transmitting the capability information associated with the first terminal to the second terminal is based on transmitting the direct communication acceptance message to the second terminal.

3. The solution of clause 1, further comprising: receiving, by the first terminal, a link modification request from the second terminal requesting an additional quality of service flow to a unicast link between the first terminal and the second terminal; and responsive to receiving the link modification request from the second terminal, transmitting a link modification acceptance message to the second terminal indicating an acceptance of the additional quality of service flow to the unicast link between the first terminal and the second terminal, wherein transmitting the capability information associated with the first terminal to the second terminal is based on transmitting the link modification acceptance message to the second terminal.

4. The solution of clause 1, wherein the first terminal transmits the capability information associated with the first terminal upon receiving a direct communication acceptance message from the second terminal, wherein the direct communication acceptance message indicates that an acceptance is in response to a direct communication request message from the first terminal requesting to establish a unicast link between the first terminal and the second terminal.

5. The solution of clause 1, wherein the first terminal transmits the capability information associated with the first terminal upon receiving the capability information associated with the second terminal from the second terminal.

6. The solution of clause 1, wherein the first terminal transmits the capability information associated with the first terminal upon receiving a capability enquiry from the second terminal.

7. The solution of clause 6, wherein the capability enquiry includes a radio access technology (RAT) type.

8. The solution of clause 6, wherein the capability enquiry includes a capability request filter.

9. The solution of clause 1, wherein the first terminal transmits the capability information associated with the first terminal upon receiving an indication from an upper layer, wherein the indication includes one of: capability transmission, the acceptance of a new unicast link with the second terminal, the acceptance of addition of a quality of service flow to the unicast link with the second terminal, the successful establishment of a new unicast link with the second terminal.

10. A solution for wireless communication, comprising: receiving, by a second terminal, capability information associated with a first terminal from the first terminal, the capability information associated with the first terminal relating to a capability of the first terminal to directly communicate with the second terminal; and determining, by the second terminal, transmission parameters for unicast communication with the first terminal.

11. The solution of clause 10, wherein said determining the transmission parameters for unicast communication with the first terminal is based on the received capability information associated with the first terminal from the first terminal.

12. The solution of clause 10, further comprising: sending, by the second terminal, capability information associated with the first terminal received from the first terminal to a communication node, wherein the capability information associated with the first terminal is sent to the communication node via a sidelink terminal information message.

13. The solution of clause 10, further comprising: receiving, by the second terminal, a capability enquiry message from the communication node, the capability enquiry message including an identifier of the first terminal; and sending, by the second terminal, capability information associated with the first terminal received from the first terminal to a communication node via a terminal capability information message.

14. The solution of any of clauses 12 and 13, further comprising: receiving, by the second terminal, a sidelink transmission configuration from the communication node; and determining, by the second terminal, transmission parameters of the unicast communication with the first terminal based on the sidelink transmission configuration.

15. The solution of any of clauses 1 and 10, wherein capability information includes an indication of supporting out-of-order delivery.

16. The solution of any of clauses 1 and 10, wherein capability information includes an indication of supporting short and/or long packet data convergence protocol (PDCP) sequence number (SN).

17. The solution of any of clauses 1 and 10, wherein capability information includes an indication of supporting radio link control (RLC) acknowledged mode (AM) short and/or long SN.

18. The solution of any of clauses 1 and 10, wherein capability information includes an indication of supporting RLC unacknowledged mode (UM) short and/or long SN.

19. The solution of any of clauses 1 and 10, wherein capability information includes supported modulation and demodulation orders.

20. The solution of any of clauses 1 and 10, wherein capability information includes an indication of supporting or enabling of hybrid automatic repeat request (HARQ) feedback.

21. The solution of any of clauses 1 and 10, wherein capability information includes an indication of supporting sidelink radio resource management (RRM) measurement.

22. The solution of any of clauses 1 and 10, wherein capability information includes an indication of supporting sidelink radio link monitoring (RLM).

23. The solution of clause 1, further comprising: transmitting, by the first terminal, security configuration information to the second terminal; and receiving, by the first terminal, a security configuration complete message from the second terminal.

24. The solution of clause 23, wherein the security configuration information includes a key for unicast communication.

25. The solution of clause 23, wherein the security configuration information includes any of an integrity protection algorithm for unicast communication and an encryption algorithm for unicast communication.

26. The solution of clause 23, wherein the security configuration information includes any of a key of integrity protection for unicast communication and a key of encryption for unicast communication.

27. The solution of clause 23, further comprising: receiving, by the first terminal, security capability information associated with the second terminal from the second terminal, wherein the security capability information includes the supported integrity protection algorithms and/or encryption algorithms for unicast communication.

28. The solution of clause 27, further comprising: forwarding, by the first terminal, security capability information associated with the second terminal relating to unicast communication with the second terminal to a communication node.

29. The solution of clause 23, further comprising: receiving, by the first terminal, security information from a communication node, wherein the security information includes at least one of a key for unicast communication, an integrity protection algorithm for unicast communication, an encryption algorithm for unicast communication, a key of integrity protection for unicast communication, and a key of encryption for unicast communication.

30. The solution of clause 23, wherein the security configuration information is applied to the integrity protection algorithm and the key of integrity protection, and wherein the second terminal verify the integrity protection of the security configuration information and transmits the security configuration complete message applied to the integrity protection algorithm and the key of the integrity protection after a check of the integrity protection is passed.

31. An apparatus for wireless communication comprising a processor that is configured to carry out the solution of any of clauses 1 to 30.

32. A non-transitory computer readable medium having code stored thereon, the code when executed by a processor, causing the processor to implement a solution recited in any of clauses 1 to 30.

The details of one or more implementations are set forth in the accompanying attachments, the drawings, and the description below. Other features will be apparent from the description and drawings, and from the clauses.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

Telematics may refer to communication protocols and data exchange standards relating to a vehicle X (X: cars, pedestrians, road-side devices connected to the Internet, etc.), a wireless communication system network, and an information exchange. Communication through the Internet of Vehicles may enable vehicles to increase driving safety, improve traffic efficiency, and access convenience or entertainment information. Vehicle network communications may include three different types: (1) communication between the vehicle and the vehicle (Vehicle-to-Vehicle (or V2V)), vehicle and roadside equipment/network infrastructure (Vehicle-to-Infrastructure/Vehicle-to-Network (or V2I/V2N), and Vehicle-to-Pedestrian (V2P). Any vehicle network communications may collectively be referred to as vehicle to everything (V2X) communication.

Figure 1:
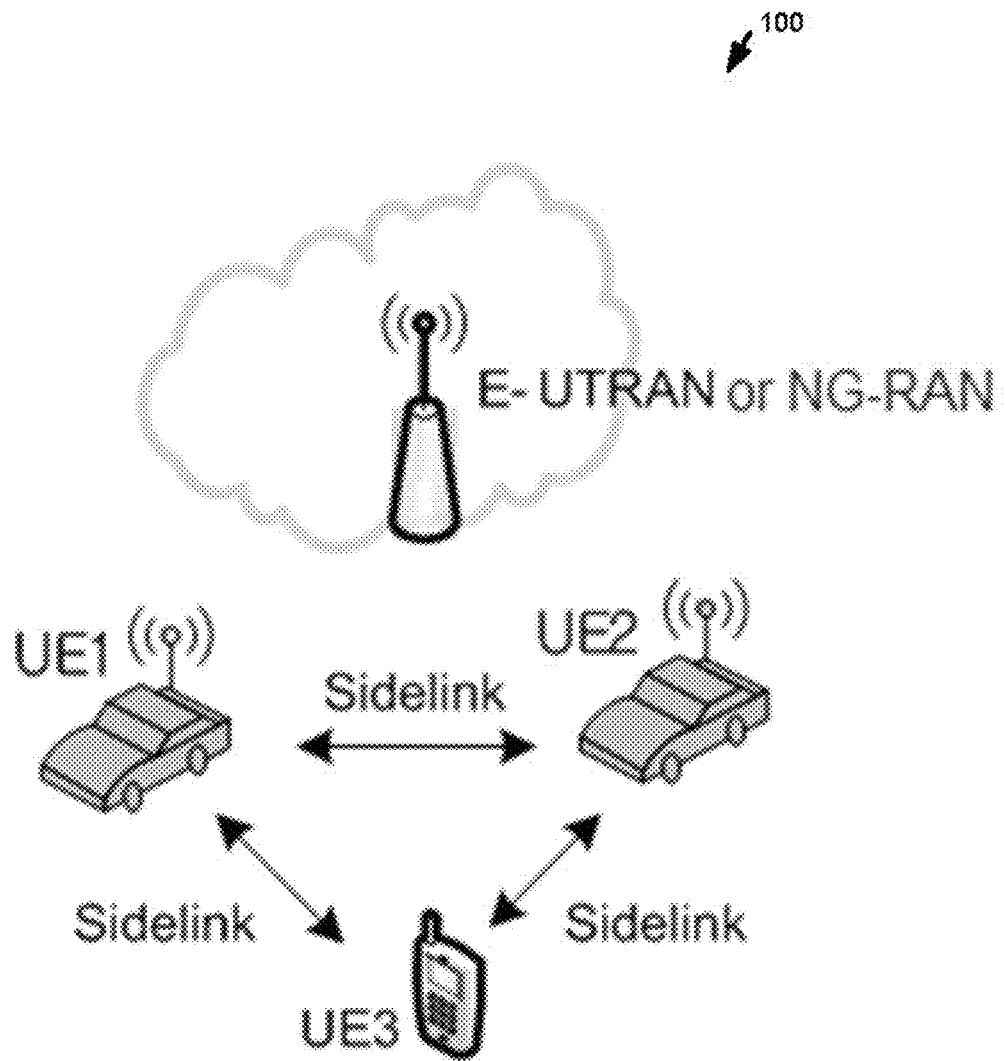
FIG. 1 is a block diagram of an example V2X communication system.

FIG. 1 is a block diagram of an example V2X communication system. In the LTE (Long Term Evolution)-based V2X communications study organized by 3GPP, user-based devices (User Equipment) may communicate using V2X communication between a direct/sidelink link. For example, data may not be forwarded by the base station and the core network, and may be directly transmitted by the source UE to the target UE through an air interface (PC5 interface), as shown in FIG. 1.

With the advancement of communication technology and the development of the automation industry, the V2X communication scenario is further extended and has higher performance requirements. 3GPP has established research on vehicle networking communication based on advanced V2X services of the fifth generation mobile communication technology (5G), including 5G air interface-based vehicle networking communication and 5G direct link (sidelink)-based vehicle networking communication.

System Overview

For NR-based vehicle to everything (V2X) sidelink unicast communications, PC5 interface RRC signaling interaction may be supported. Specifically, PC5 RRC signaling may include a message for transmitting UE capability information. The present embodiments relate to obtaining peer UE's capability information and interacting for PC5 UE capability information exchange for sidelink transmission parameters selection. In addition, PC5 RRC signaling may not be transmitted without security protection, and the present embodiments may provide a security protection mechanism for protecting PC5 RRC signaling at the access-stratum (AS) layer.

In a first embodiment, a first UE may transmit sidelink capability information to a second UE. The transmission of sidelink capability information may be triggered by any of: (1) a higher layer indication, (2) sending a direct communication acceptance message, (3) sending a link modification acceptance message, (4) receiving capability information relating to a peer UE, and (5) receiving a direct communication acceptance message.

The first UE may receive a sidelink capability enquiry message from the second UE before the first UE sends sidelink capability information to the second UE.

After receiving the first UE's sidelink capability information, the second UE may report the first UE's sidelink capability information to the base station via SidelinkUE-Information.

The second UE may report first UE's sidelink capability information via a UECapablility message to the base station when receiving a capability enquiry message from the base station. The capability enquiry message may indicate the identifier of the first UE, where the identifier may include a L2 ID, an AS-level ID, or another ID identifying the first UE.

The first UE may send sidelink security configuration information to the second UE. Sidelink security configuration information may include at least one of: a key for sidelink unicast communication, an integrity protection algorithm for sidelink unicast communication, and an encryption algorithm for sidelink unicast communication.

The sidelink security configuration information may include any of a key $K_{SLRRCint}$ for sidelink unicast signaling integrity protection and a key $K_{SLRRCenc}$ for sidelink unicast signaling encryption. Sidelink Security Configuration Information/Sidelink Security Completion Information can be sent via a newly defined sidelink security mode command/security mode complete signaling message or included in the PC5 RRC connection establishment request/response message to send or may be included in the PC5 SRB configuration information/response information to send.

Before the first UE sends sidelink security configuration information to the second UE, the first UE may receive the sidelink security capability information sent by the second UE.

The first UE may send the second UE's sidelink security capability information to the base station. Before the first UE sends the sidelink security configuration to the second UE, the first UE may receive the sidelink security information sent by the base station.

The sidelink security information may include keys for sidelink unicast communication, integrity protection algorithm and encryption algorithm.

Example Embodiment 1

The PC5 UE capability interaction may include a one-way procedure or a two-way procedure. In the one-way procedure, a first UE (UE1) may directly send its own UE capability information to the peer UE (UE2). In the two-way procedure, the UE1 may send its own capability information to the peer UE2 only when receiving capability enquiry message from UE2.

Figure 2:
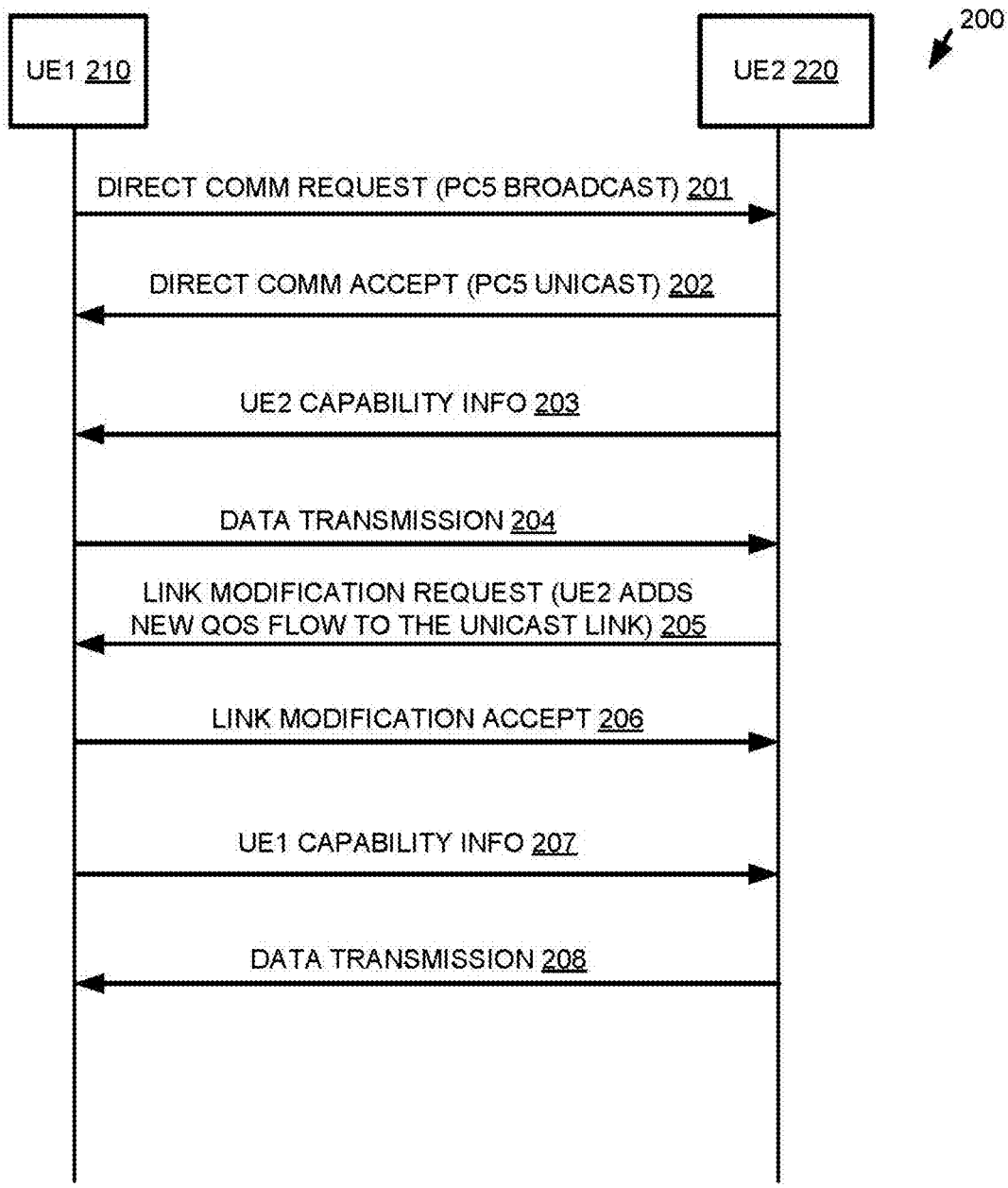
FIG. 2 illustrates a signaling process to obtain peer UE capability information and transmit UE capability information in a one-way procedure.

FIG. 2 illustrates a signaling process 200 to obtain peer UE capability information and transmit UE capability information in a one-way procedure. As shown in FIG. 2, step 201 may include UE1 210 sending a direct communication request (PC5 broadcast) to UE2 220.

When the UE2 220 decides to accept the direct communication request message sent by the UE1 210 and sends a direct communication acceptance message to the UE1 210 (step 202), the UE2 220 may trigger the sending of the UE capability to the UE1 210 (step 203). Specifically, the UE2 220 may send the UE capability triggered by the upper layer (e.g., the V2X layer). When the upper layer sends the direct communication accept message (step 202), the upper layer may explicitly indicate the UE2 220 sends the UE capability or the UE2 220 indirectly being triggered to send the UE capability according to the direct communication acceptance message submitted by the upper layer. The UE2 220 may send the UE capability information after sending the direct communication accept message, or the direct communication accept message and the UE capability information may be multiplexed in the same MAC PDU to transmit. The PC5 RRC signaling may be sent in the RLC AM mode. If the UE2 220 does not receive the ack feedback corresponding to the UE capability information from UE1, the UE2 220 may send/retransmit the UE capability information to the UE1 210 again.

After obtaining the capability information associated with the UE2 220, the UE1 210 may select/adjust the transmission parameter to communicate with the UE2 220. Then UE1 transmits V2X packets to UE2 (step 204).

The PC5 unicast link can be used for bidirectional data transmission. After a period of time, if UE2 220 has data to send to UE1 210, UE2 220 may initiate a link modification request (step 205) to add new PC5 QoS flow information to the unicast link. If UE1 210 agrees to add the new QoS flow to the unicast link, UE1 responses by sending a link modification accept message (step 206).

When UE1 210 decides to send a link modification accept message (step 206), UE1 210 may be triggered to send the UE capability to UE2 220 (step 207). Specifically, the UE1 210 may send the UE capability being triggered by the upper layer (e.g., the V2X layer), and when the upper layer sends the link modification accept message, the UE1 210 may indicate that the UE1 210 access layer sends the UE capability.

After obtaining the capability information of the UE1 210, the UE2 220 may select/adjust the transmission parameter to send data to the UE1 210. The UE1 210 may send the UE capability information after transmitting the link modification accept message, or the link modification accept message and the UE capability message may be multiplexed in the same MAC PDU to transmit. UE2 220 may transmit data (step 208) to the UE1 210 after receiving UE1 210 capability information.

Figure 3:
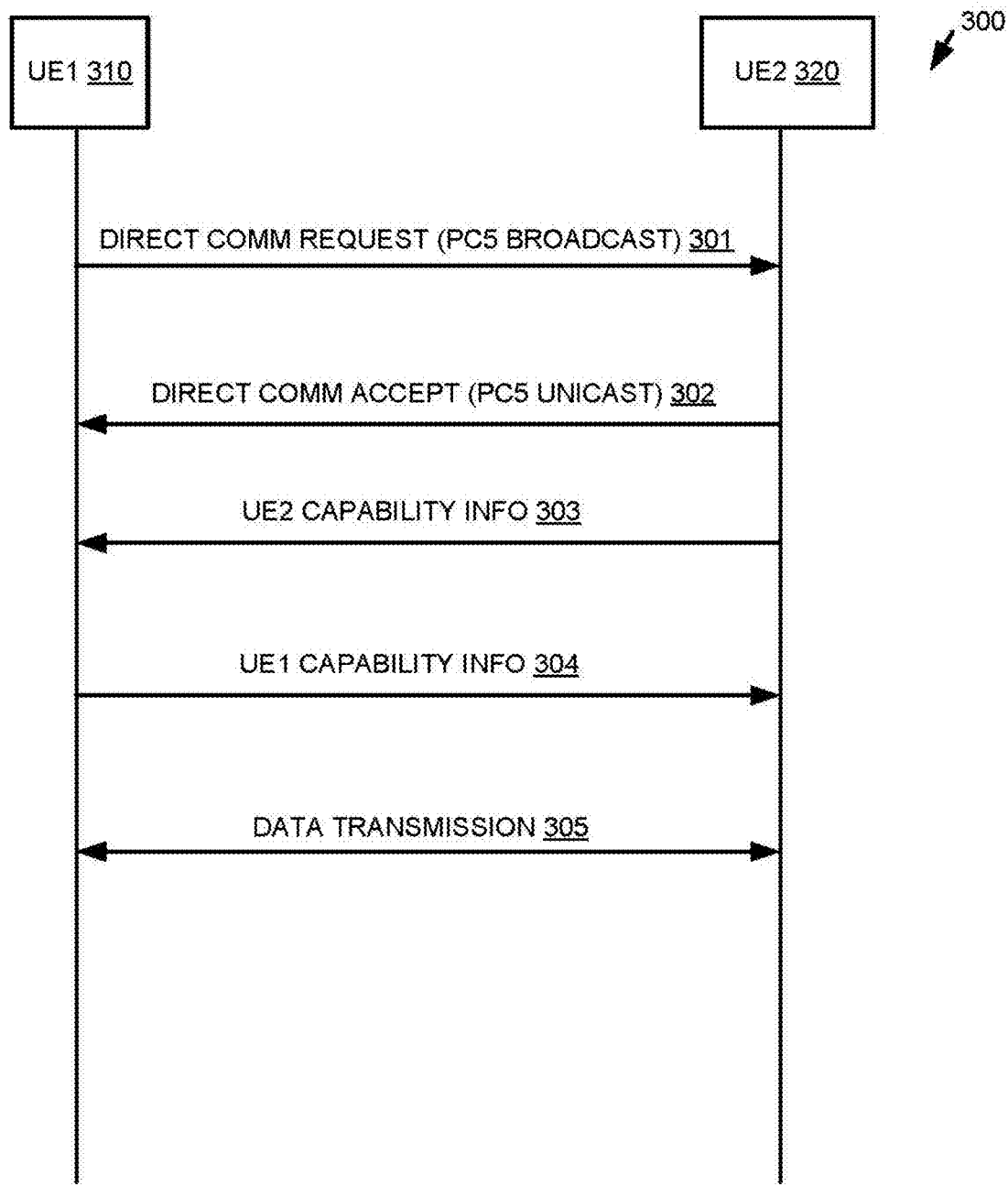
FIG. 3 illustrates a signaling process to obtain peer UE's capability information and transmit UE capability information in a one-way procedure.

FIG. 3 illustrates a signaling process 300 to obtain peer UE's capability information and transmit UE capability information in a one-way procedure.

Considering that the PC5 unicast link usually has bidirectional data transmission, the UE capability interaction can be performed immediately after the PC5 unicast link is established, which facilitates subsequent bidirectional data transmission. As shown in FIG. 3, when UE2 320 decides to accept the direct communication request message (step 301) sent by UE1 310, UE2 320 may send a direct communication acceptance message (step 302) to UE1 310. Upon sending the direct communication acceptance message (step 302), UE2 320 may trigger the transmission of UE capability (step 303) to UE1 310.

Upon receiving the direct communication accept message from UE2 (successful establishment of the unicast communication link), the UE1 310 may transmit its UE capability information (step 304) to the UE2 320. In this manner, there may be no association between UE1 310 transmitting UE capability information and UE2 320 transmitting UE capability information.

Alternatively, upon receiving the direct communication acceptance message and UE capability information from UE2, UE1 310 may transmit its UE capability information to the UE2 320. Optionally, the UE capability exchange may be initiated after the PC5 unicast link between the UE1 310 and the UE2 320 is successfully established. For example, after receiving the direct communication accept message sent by the UE2 320, the UE1 310 may be triggered to send the UE capability information to the UE2 320, and the UE2 320 sends the UE capability information to the UE1 310 upon receiving the UE capability information of the UE1 310.

The UE capability information may include the sidelink capability information of the UE on the PC5 interface, including at least one of the following: information indicating whether to support the out-of-order delivery, information indicating whether to support the short PDCP SN, the supported header compression profile, the supported integrity protection algorithms, and the supported encryption and decryption algorithms, information indicating whether to support RLC AM short SN, information indicating whether to support RLC UM short SN, information indicating whether to support RLC UM long SN, supported modulation and demodulation orders/modulation and demodulation coding mechanisms, information indicating whether to support 64 QAM, information indicating whether to support HARQ feedback, information indicating whether HARQ feedback is enabled, information indicating whether to support transmit diversity, information indicating whether to support sidelink RRM measurement, information indicating whether to support sidelink RLM/RLF measurement, supported cellular and sidelink band combination information, supported sidelink band combination information, information indicating whether to support synchronization signal transmission, and a supported RF parameter.

The supported modulation and demodulation orders/modulation and demodulation coding mechanisms may include at least one of the following: BPSK, QPSK, QAM16, QAM64, QAM256. Whether to support 64 QAM may further include at least one of the following: information indicating whether to support 64 QAM reception, information indicating whether to support 64 QAM transmission. Information indicating whether to support the HARQ feedback may include at least one of the following: information indicating whether to support unicast HARQ feedback, information indicating whether to support the groupcast HARQ feedback mode 1, and information indicating whether to support the groupcast HARQ feedback mode 2. The groupcast HARQ feedback mode 1 means that the receiving UEs share the feedback resource and may only perform HARQ NACK feedback. The groupcast HARQ feedback mode 2 may refer to that each receiving UE uses an independent feedback resource. Information indicating whether to support the transmit diversity, further includes at least one of the following: information indicating whether to support the small delay Cyclic Delay Diversity, information indicating whether to support the space-frequency block code. The supported RF parameters may include at least one of the following: FR1 (low frequency carrier frequency range, such as 0-6 GHz), FR2 (high frequency carrier frequency range, such as 6 GHz or higher).

For the two-way procedure, the UE1 may send its own capability information to the peer UE2 only when receiving capability enquiry message from UE2. The capability enquiry message may include at least one of the following: a radio access technology (RAT) type, and capability request filtering. The wireless access technology type may include at least one of the following: a new air interface (R16), or a forward-compatible version of the subsequent protocol. The capability request may be filtered, indicating that only the capability information of some aspects of the peer UE is requested, for example, the peer UE is only requested to transmit the supported modulation and demodulation orders/ modulation and demodulation coding mechanisms and the capability of supporting HARQ feedback.

Example Embodiment 2

If UE1 is in a connected state, the UE1 may report UE2's capability information to the base station after obtaining the sidelink capability information for the peer UE2 in order for the base station to configure sidelink unicast communication between UE1 and UE2.

The UE1 may transmit the sidelink capability information of the unicast communication peer UE (such as UE2 and other unicast communication target UEs) to the base station via the sidelink UE Information. The UE sidelink capability information may include at least one of the following: out-of-order delivery, short PDCP SN, supported header compressed profiles, supported integrity protection algorithms, supported encryption and decryption algorithms, RLC AM short SN, RLC UM short SN, RLC UM long SN, modulation and demodulation order/modulation and demodulation coding mechanism, information indicating whether to support 64 QAM, HARQ feedback, information indicating whether HARQ is enabled/disabled, information indicating whether to support transmit diversity, sidelink RRM measurement, sidelink RLM/RLF measurement, cellular and sidelink band combination information, sidelink frequency band combination information, synchronization signal transmission, and RF parameters.

Optionally, after the UE1 indicates a target UE (such as UE2) of the sidelink unicast communication to the base station, when the capability request information sent by the base station indicates that the capability information of the sidelink unicast communication target UE2 is requested, the UE1 may transmit the sidelink capability information of UE2 to the base station.

Alternatively, when receiving capability enquiry from the base station, the UE1 may send its own sidelink capability information and sidelink unicast communication target UE2's capability information report message to the base station.

After obtaining the sidelink capability information of the sidelink unicast communication peer/target UE reported by the UE1, the base station may determine the unicast communication related configuration of the UE1 and the UE2 according to the capability information of the UE1 and the peer UE2, such as the sidelink resource configuration mode and the modulation and demodulation scheme/encoding mechanism, PDCP SN length, RLC SN length, sidelink RRM measurement configuration, etc., and send the relevant configuration to UE1. UE1 may utilize the base station configured sidelink unicast transmission parameters for subsequent communication with UE2.

Example Embodiment 3

Figure 4:
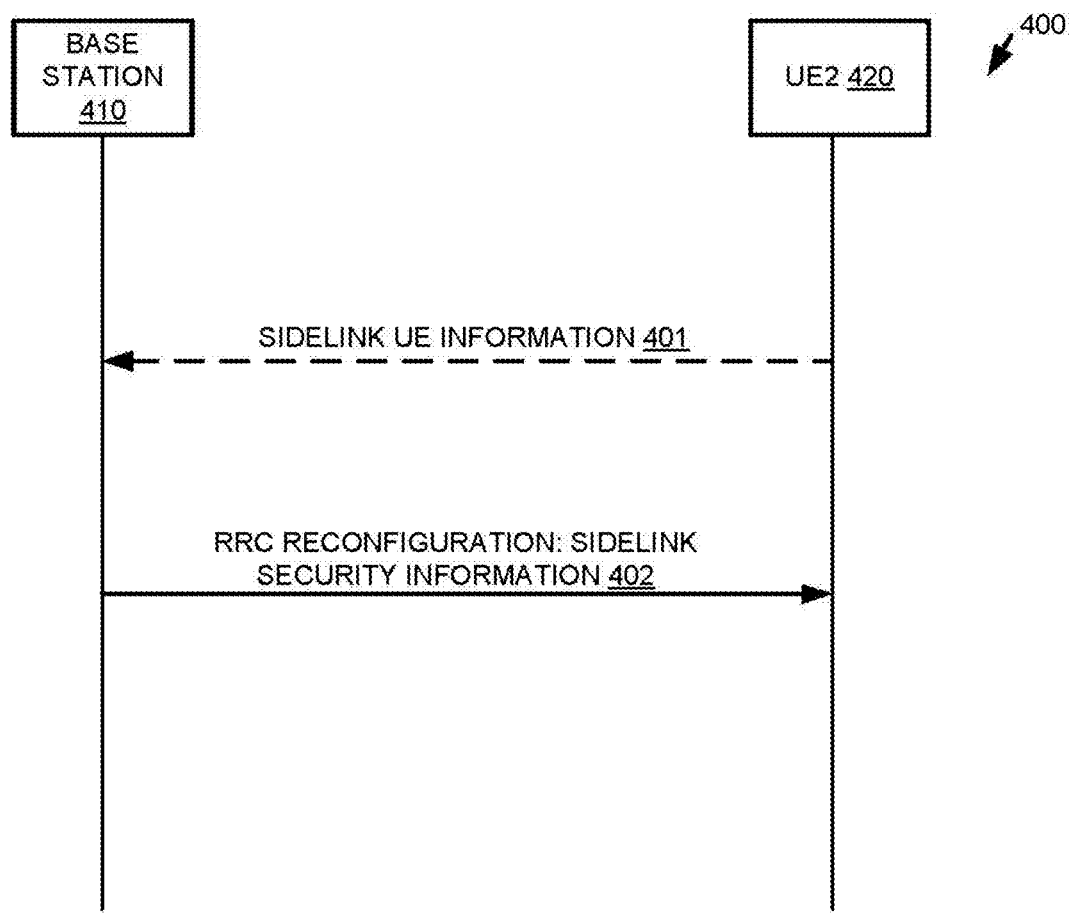
FIG. 4 illustrates a signaling process to receive sidelink security information from a base station.

FIG. 4 illustrates a signaling process 400 to receive sidelink security information from a base station. The V2X data packet may include security certificates, thus AS security mechanism for user plane may not need. However, for PC5 RRC signaling, security protection for PC5 RRC/control plane may be considered. The security protection of PC5 RRC signaling/control plane can be provided by the access-stratum (AS) layer security protection mechanism.

For a RRC-connected UE that initiates sidelink unicast communication, the base station can provide security configuration for the sidelink. When receiving a new target (UE2) of sidelink unicast communication from UE1, the base station provides UE1 the sidelink security information for sidelink unicast signaling and/or data transmission between UE1 and UE2, comprising at least one of the following: a sidelink unicast communication secret key, integrity protection algorithm for signaling, integrity protection algorithm for data, encryption algorithm for data and encryption algorithm for signaling. Sidelink security information can be included as part of the PC5 SRB/DRB configuration or as part of a sidelink unicast communication common configuration.

After receiving sidelink security information from the base station, the UE1 derives the integrity protection key $K_{SLRRCint}$ and encryption key $K_{SLRRCenc}$ for sidelink unicast signaling and the integrity protection key $K_{SLUPint}$ and encryption key $K_{SLUPenc}$ for sidelink unicast data transmission. Alternatively, the UE1 may receive the sidelink security key information directly from the base station, i.e., the base station may transmit to the UE1 of sidelink security key information which may include: $K_{SLUPint}$ and $K_{SLUPenc}$.

Figure 5:
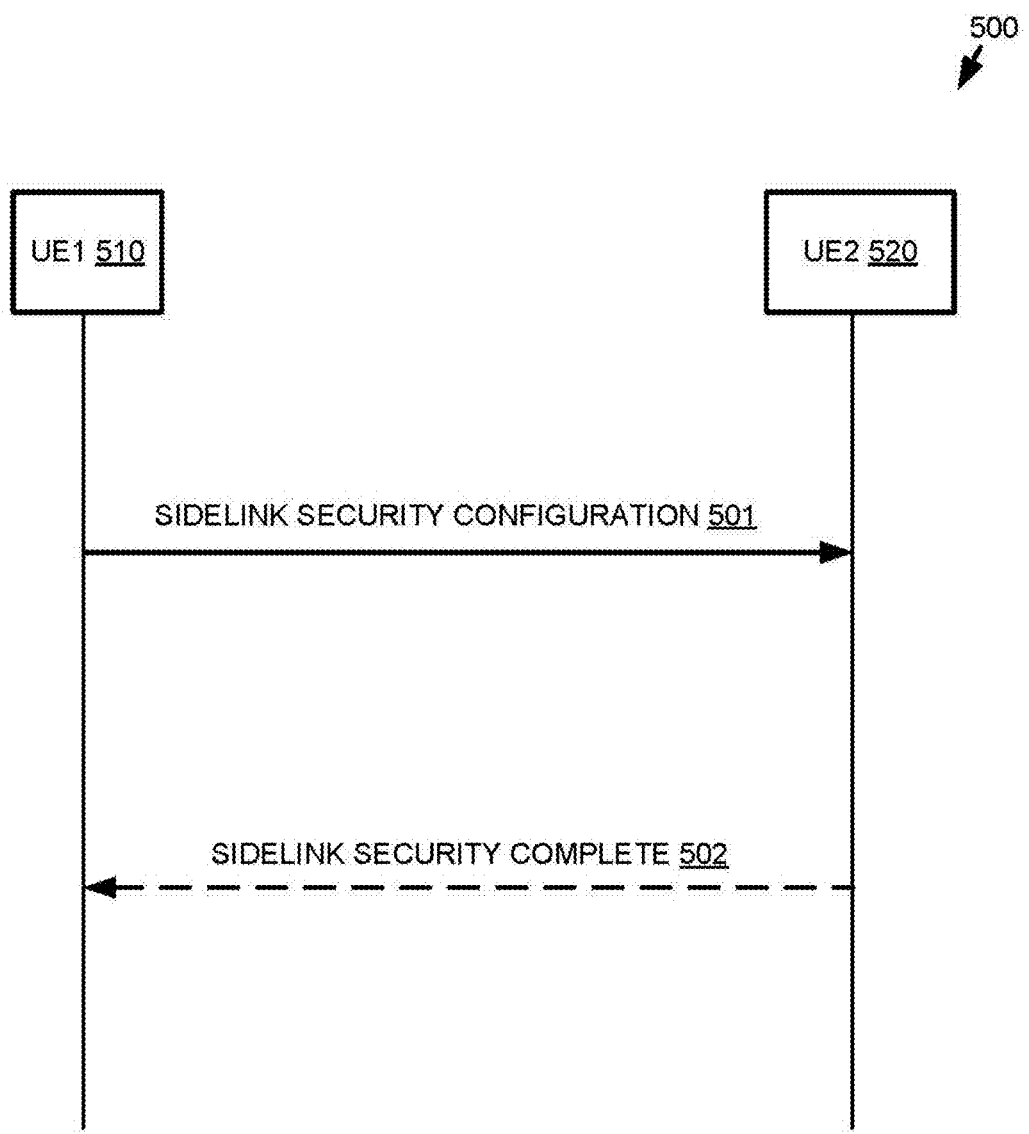
FIG. 5 illustrates a signaling process to forward sidelink security configuration information between peer UEs.

FIG. 5 illustrates a signaling process 500 to forward sidelink security configuration information between peer UEs.

UE1 may transmit sidelink security configuration information to the UE2 (step 501), the UE2 may receive integrity protection algorithm and encryption algorithm and obtain/derive the $K_{SLRRCint}$ and $K_{SLRRCenc}$ for signaling and the $K_{SLUPint}$ and $K_{SLUPenc}$ for data. UE2 then transmits sidelink security complete message to the UE1.

UE1 may transmit sidelink security configuration information to the UE2, sidelink security configuration information may include at least one of the following: a sidelink unicast communication key, integrity protection algorithm for signaling, integrity protection algorithm for data, encryption algorithm for signaling, encryption algorithm for data, $K_{SLRRCint}$, $K_{SLRRCenc}$, $K_{SLUPint}$ and $K_{SLUPenc}$. If the sidelink security configuration information received by UE2 does not include the key $K_{SLRRCint}$, $K_{SLRRCenc}$, $K_{SLUPint}$ and $K_{SLUPenc}$, UE2 may derive the keys such as $K_{SLRRCint}$, $K_{SLRRCenc}$, $K_{SLUPint}$ and $K_{SLUPenc}$ by itself. And UE2 sends a sidelink security completion message to UE1.

The sidelink security configuration information/sidelink security completion information may be sent through the newly defined sidelink security mode command/security mode complete signaling messages or included in the PC5 RRC Connection Setup Request/Response message or included in PC5 RRC messages for PC5 SRB configuration/response message. Thus, the security protection of sidelink unicast signaling is activated between UE1 and UE2, all subsequent PC5 RRC signaling and/or data using the corresponding encryption algorithm and integrity protection algorithm and the corresponding key $K_{SLRRCint}$, $K_{SLRRCenc}$, $K_{SLUPint}$ and $K_{SLUPenc}$ for security protection.

Alternatively, the UE1 may apply the integrity protection for signaling using indicated algorithm and corresponding key $K_{SLRRCint}$ to transmit the security configuration information. Upon receiving the security configuration information from UE1, UE2 verifies the integrity protection of the message using the algorithm indicated in the message and the corresponding key, after the integrity protection verification is passed, $K_{SLRRCenc}$, $K_{SLUPint}$ and $K_{SLUPenc}$ may be derived. The UE2 may perform integrity protection on the PC5 RRC message including the sidelink security completion information by using the integrity protection algorithm configured by the UE1 and the corresponding key when transmitting the sidelink security completion information.

For non-connected state UE1 (RRC IDLE/inactive, out of coverage), the UE1 may obtain security configuration information from a broadcast system information message or pre-configuration, such as sidelink unicast communication key, integrity protection algorithm for signaling, integrity protection algorithm for data, encryption algorithm for signaling, and encryption algorithm for data. UE1 then derives the corresponding keys for sidelink unicast signaling and/or data security protection, such as $K_{SLRRCint}$, $K_{SLRRCenc}$, $K_{SLUPint}$ and $K_{SLUPenc}$.

Optionally, UE1 and UE2 may exchange/negotiate sidelink security configuration. UE1 may obtain security capability information of UE2, such as a supported integrity protection algorithm and an encryption algorithm for sidelink unicast signaling and data. UE1 may combine its own security capability information with the security capability information of UE2 to determine the sidelink security configuration and sends sidelink security configuration information to UE2. The sidelink security configuration information may include at least one of the following: a key for sidelink unicast communication, integrity protection algorithm for signaling, integrity protection algorithm for data, encryption algorithm for signaling and encryption algorithm for data. UE2 may derive the corresponding keys $K_{SLRRCint}$, $K_{SLRRCenc}$, $K_{SLUPint}$ and $K_{SLUPenc}$. Optionally, the sidelink security configuration information may also include the keys $K_{SLRRCint}$, $K_{SLRRCenc}$, $K_{SLUPint}$ and $K_{SLUPenc}$.

UE2 may send sidelink security completion information to UE1 (step 502). Thus, the security protection of sidelink unicast signaling is activated between UE1 and UE2, all subsequent PC5 RRC signaling and/or data using the corresponding encryption algorithm and integrity protection algorithm and the corresponding key $K_{SLRRCint}$, $K_{SLRRCenc}$, $K_{SLUPint}$ and $K_{SLUPenc}$ for security protection.

Example Embodiment 4

According to MAC multiplexing and logical channel prioritization procedure in LTE V2X sidelink communication, data belonging to logical channels identified by different source layer 2 ID and destination layer 2 IDs (identifier) may be unable to be multiplexed into the same MAC PDU for transmission. In NR V2X, multiple unicast communication links identified by different source layer 2 ID and destination layer 2 IDs may be established between two UEs. If the MAC multiplexing and logical channel prioritization procedures of LTE V2X are followed, data associated with logical channels identified by different source layer 2 ID and destination layer 2 IDs may not be able to be multiplexed into the same MAC PDU for transmission between the same peer UE, so there may be some waste of resources in some cases. For example, after available data on sidelink logical channels of the selected destination layer 2 ID are sent, there still may be resources left, and then these resources may be unutilized. In order to improve resource utilization efficiency, Example Embodiment 4 relates to improving the MAC multiplexing and logical channel prioritization processes for sidelink unicast communication.

Scenario 1

Figure 6:
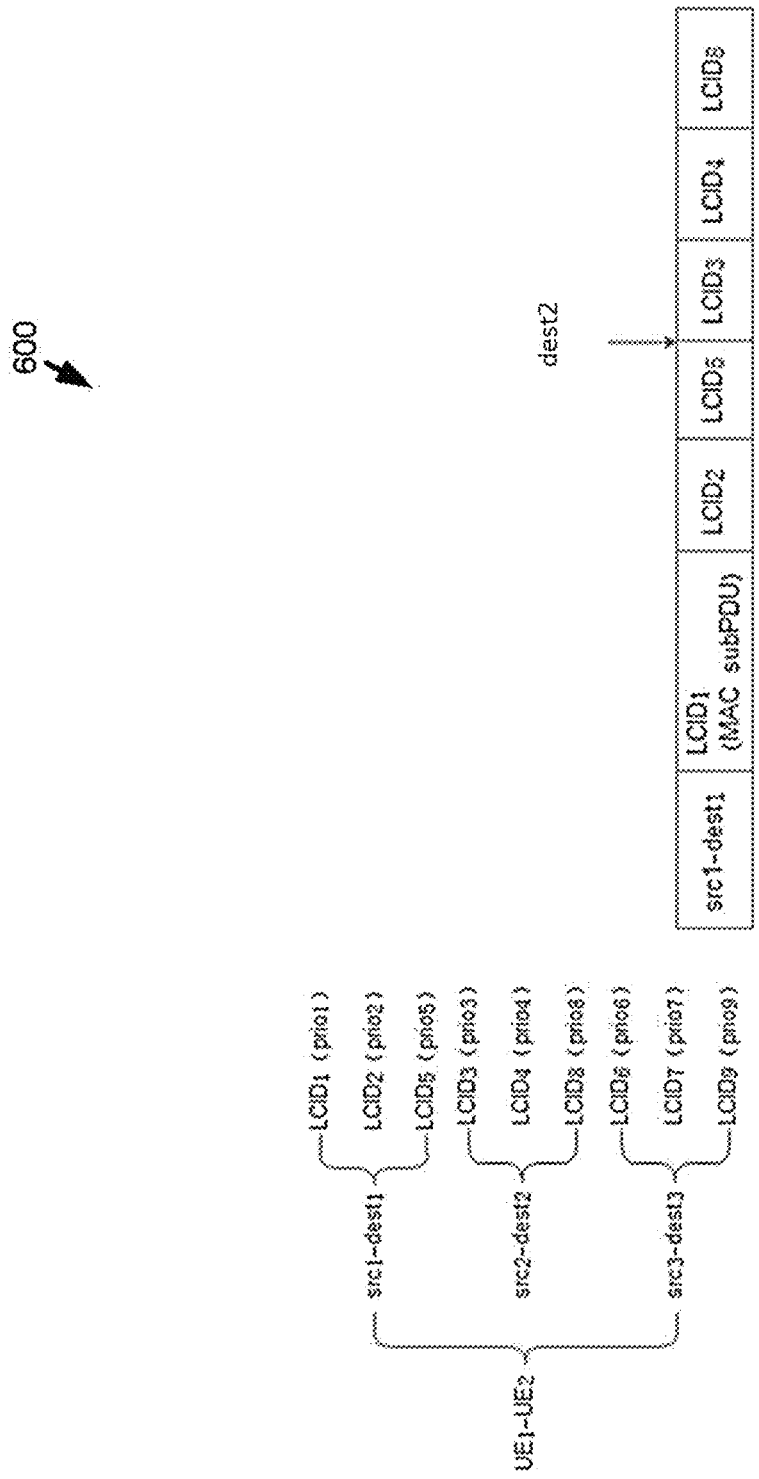
FIG. 6 illustrates a block diagram of a MAC PDU format, according to a first scenario.

FIG. 6 illustrates a block diagram 600 of a MAC PDU format, according to a first scenario. In a first scenario, according to LTE V2X, the logical channel identity (LCID) may be unique within the source and destination layer 2 identities. That is, if there is more than one unicast communication link with different source and destination layer 2 IDs between the two UEs, these unicast communication links identified by different source and destination layer 2 IDs may include the same LCID.

In some embodiments, LCID may be modified to be unique within a UE, rather than unique within the source and destination layer 2 identities. A UE may use different logical channel identities (no duplication) for all destination layer 2 identities (whether unicast, groupcast, or broadcast). In LCP, when the UE first selects the first destination (target layer 2 identity), all the logical channel data may be transferred and there are remaining resources.

The UE can continue to select the second destination in the other unicast links within the actual pair UEs corresponding to the first destination and continue to serve the second destination's logical channels in decreasing order of logical channel priority until resources are exhausted. In this scenario, only the first destination layer 2 ID (and the corresponding source layer 2 ID) may be included in the MAC PDU subheader. Because the PC5 unicast communication may begin with an interactive SLRB (and associated LCID) configuration, the peer UE can identify the corresponding source and destination layer 2 identity according to the LCID which is unique in the source UE. As shown in FIG. 6, there may be 3 unicast links between UE1 and UE2, src1-dest1, src2-dest2 and src3-dest3, each with multiple logical channel data transmissions.

Scenario 2

Figure 7:
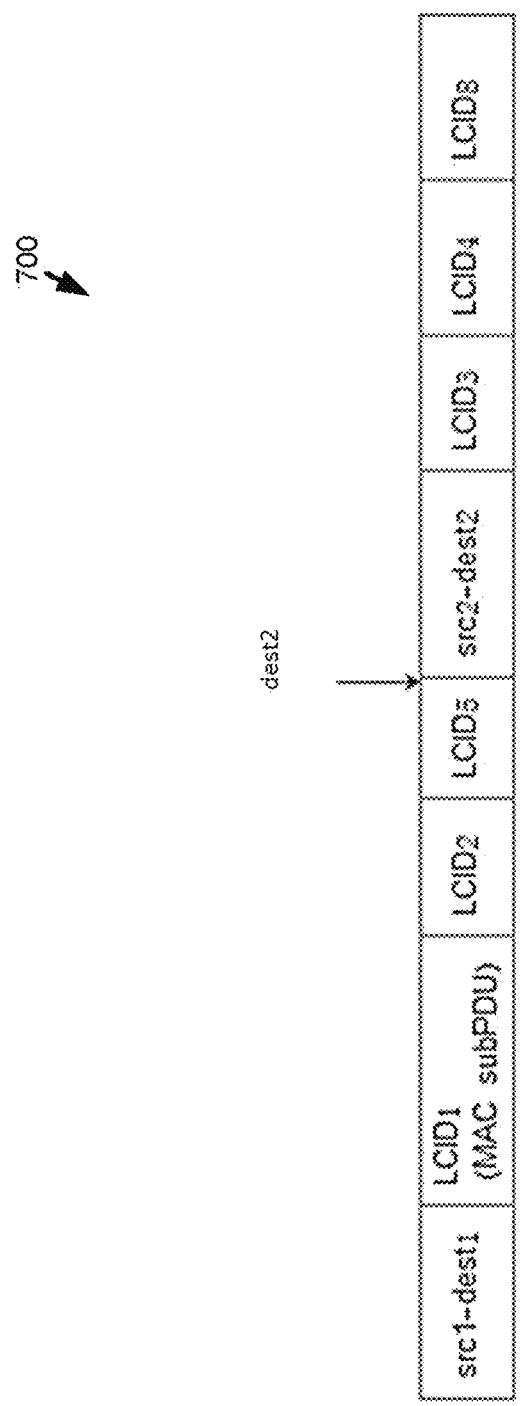
FIG. 7 illustrates a block diagram of a MAC PDU format, according to a second scenario.

FIG. 7 illustrates a block diagram 700 of a MAC PDU format, according to a second scenario. A second scenario may include optimizing the MAC PDU format for sidelink unicast communication. First, UE1 and UE2 may identify each other the multiple unicast links with different source and destination layer 2 identities between them. Then, in the LCP procedure, when all the logical channel data of the first destination (destination layer 2 identity, actually corresponding to the UE2) the UE selected are transferred and there are remaining resources, UE1 can then continue to select the second destination in the other unicast links towards the actual target UE (UE2) corresponding to the first destination, and continue to serve the logical channels of the second destination in descending order of logical channel priority until resources are exhausted. In this scenario, there may be multiple subheaders in a MAC PDU, behind each of which places the data (MAC subPDU) identified by the associated LCID corresponding to the source and destination layer 2 ID. If there is space left/remaining resources, after the first MAC subhead (src1-dest1) and its associated LCID data (MAC subPDU) identified by the source layer 2 ID1 and destination layer 2 ID1, the second MAC subhead (src2-dest2) and its associated LCID data (MAC subPDU) identified the source layer 2 ID2 and destination layer 2 ID2 may be followed until space is exhausted.

Figure 8:
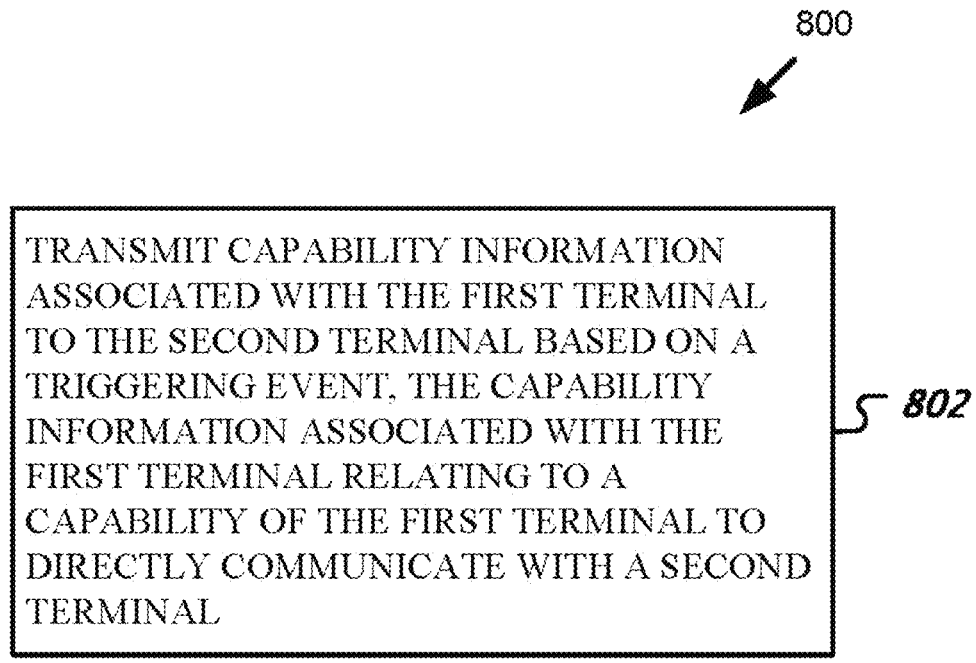
FIG. 8 illustrates a block diagram of a method to transmit sidelink capability information between peer terminals.

FIG. 8 illustrates a block diagram 800 of a method to transmit sidelink capability information between peer terminals. The method may include transmitting, by the first terminal, capability information associated with the first terminal to the second terminal based on a triggering event, the capability information associated with the first terminal relating to a capability of the first terminal to directly communicate with a second terminal (block 8002). The capability information may include sidelink capability information as described in the present embodiments.

In some embodiments, the method includes receiving, by the first terminal, a direct communication request message from the second terminal indicating a request to establish a unicast link between the first terminal and the second terminal; and transmitting, by the first terminal, a direct communication acceptance message to the second terminal indicating an acceptance of establishing the unicast link between the first terminal and the second terminal, wherein transmitting the capability information associated with the first terminal to the second terminal is based on transmitting the direct communication acceptance message to the second terminal.

In some embodiments, the method includes receiving, by the first terminal, a link modification request from the second terminal requesting an additional quality of service flow to a unicast link between the first terminal and the second terminal; and responsive to receiving the link modification request from the second terminal, transmitting a link modification acceptance message to the second terminal indicating an acceptance of the additional quality of service flow to the unicast link between the first terminal and the second terminal, wherein transmitting the capability information associated with the first terminal to the second terminal is based on transmitting the link modification acceptance message to the second terminal.

In some embodiments, the first terminal transmits the capability information associated with the first terminal upon receiving a direct communication acceptance message from the second terminal, wherein the direct communication acceptance message indicates that an acceptance is in response to a direct communication request message from the first terminal requesting to establish a unicast link between the first terminal and the second terminal.

In some embodiments, the first terminal transmits the capability information associated with the first terminal upon receiving the capability information associated with the second terminal from the second terminal.

In some embodiments, the first terminal transmits the capability information associated with the first terminal upon receiving a capability enquiry from the second terminal.

In some embodiments, the capability enquiry includes a radio access technology (RAT) type.

In some embodiments, the capability enquiry includes a capability request filter.

In some embodiments, first terminal transmits the capability information associated with the first terminal upon receiving an indication from an upper layer, wherein the indication includes one of: capability transmission, the acceptance of a new unicast link with the second terminal, the acceptance of addition of a quality of service flow to the unicast link with the second terminal, the successful establishment of a new unicast link with the second terminal.

In another embodiment, a method for wireless communications includes receiving, by a second terminal, capability information associated with a first terminal from the first terminal, the capability information associated with the first terminal relating to a capability of the first terminal to directly communicate with the second terminal; and determining, by the second terminal, transmission parameters for unicast communication with the first terminal.

In some embodiments, said determining the transmission parameters for unicast communication with the first terminal is based on receiving the capability information associated with the first terminal from the first terminal.

In some embodiments, the method includes sending, by the second terminal, capability information associated with the first terminal received from the first terminal to a communication node, wherein the capability information associated with the first terminal is sent to the communication node via a sidelink terminal information message.

In some embodiments, the method includes receiving, by the second terminal, a capability enquiry message from the communication node, the capability enquiry message including an identifier of the first terminal; and sending, by the second terminal, capability information associated with the first terminal received from the first terminal to a communication node via a terminal capability information message.

In some embodiments, the method includes receiving, by the second terminal, a sidelink transmission configuration from the communication node; and determining, by the second terminal, transmission parameters of the unicast communication with the first terminal based on the sidelink transmission configuration.

In some embodiments, capability information includes an indication of supporting out-of-order delivery.

In some embodiments, capability information includes an indication of supporting short and/or long packet data convergence protocol (PDCP) sequence number (SN).

In some embodiments, capability information includes an indication of supporting radio link control (RLC) acknowledged mode (AM) short and/or long SN.

In some embodiments, capability information includes an indication of supporting RLC unacknowledged mode (UM) short and/or long SN.

18. The solution of any of clauses 1 and 9, wherein capability information includes supported modulation and demodulation orders.

In some embodiments, capability information includes an indication of supporting or enabling of hybrid automatic repeat request (HARQ) feedback.

In some embodiments, capability information includes an indication of supporting sidelink radio resource management (RRM) measurement.

In some embodiments, capability information includes an indication of supporting sidelink radio link monitoring (RLM).

In some embodiments, the method includes transmitting, by the first terminal, security configuration information to the second terminal; and receiving, by the first terminal, a security configuration complete message from the second terminal.

In some embodiments, the security configuration information includes a key for unicast communication.

In some embodiments, the security configuration information includes any of an integrity protection algorithm for unicast communication and an encryption algorithm for unicast communication.

In some embodiments, the security configuration information includes any of a key of integrity protection for unicast communication and a key of encryption for unicast communication.

In some embodiments, the method includes receiving, by the first terminal, security capability information associated with the second terminal from the second terminal, wherein the security capability information includes the supported integrity protection algorithms and/or encryption algorithms for unicast communication.

In some embodiments, the method includes forwarding, by the first terminal, security capability information associated with the second terminal relating to unicast communication to a communication node.

In some embodiments, the method includes transmitting, by the first terminal, security capability information associated with the first terminal relating to unicast communication to a communication node.

In some embodiments, the method includes receiving, by the first terminal, security information from a communication node, wherein the security information includes at least one of a key for unicast communication, an integrity protection algorithm for unicast communication, an encryption algorithm for unicast communication, a key of integrity protection for unicast communication, and a key of encryption for unicast communication.

In some embodiments, the security configuration information is applied to the integrity protection algorithm and the key of integrity protection, and wherein the second terminal verify the integrity protection of the security configuration information and transmits the security configuration complete message applied to the integrity protection algorithm and the key of the integrity protection after a check of the integrity protection is passed.

In some embodiments, the method includes assembling, by the second terminal, a MAC PDU to send to the first terminal, Wherein the MAC PDU includes a MAC subheader, which includes a first pair of source identifier and destination identifier identifying a first unicast link between the second terminal and the first terminal and multiple MAC subPDUs, each of which identified by a logical channel identity, wherein each of the logical channel identity is unique in the second terminal, wherein the MAC subPDUs identified by logical channel identities belong to a first pair of source identifier and destination identifier identifying a first unicast link and a second pair of source identifier and destination identifier identifying a second unicast link between the second terminal and the first terminal.

In some embodiments, the method includes assembling, by the second terminal, a MAC PDU to send to the first terminal, wherein the MAC PDU includes a first MAC subheader, which includes a first pair of source identifier and destination identifier identifying a first unicast link between the second terminal and the first terminal, and followed several MAC subPDUs, each of which identified by a logical channel identity, belong to the first pair of source identifier and destination identifier, and a second MAC subheader, which includes a second pair of source identifier and destination identifier identifying a second unicast link between the second terminal and the first terminal, and followed several MAC subPDUs, each of which identified by a logical channel identity, belong to the second pair of source identifier and destination identifier.

Figure 9:
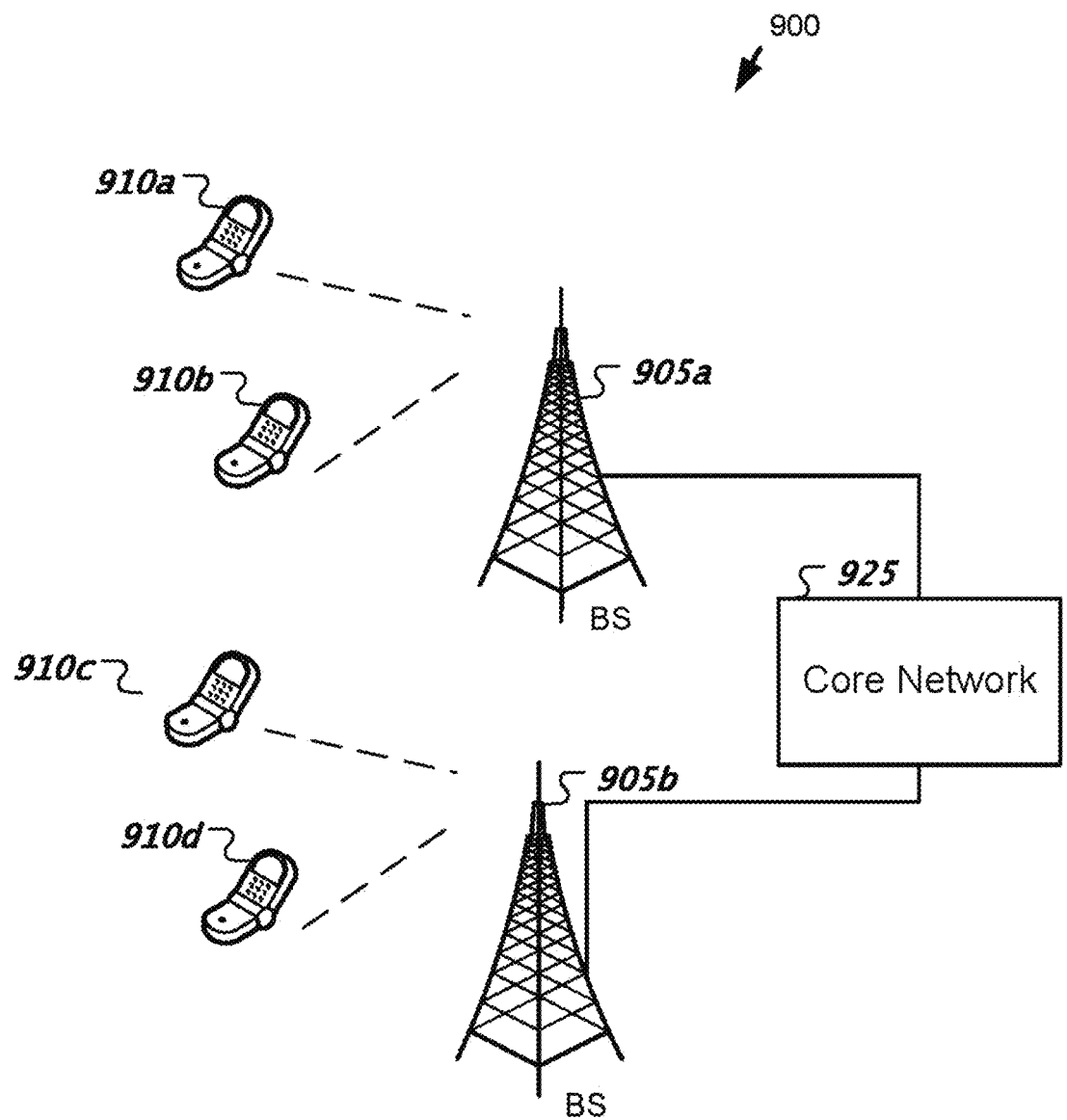
FIG. 9 shows an example of a wireless communication system where techniques in accordance with one or more embodiments of the present technology can be applied.

FIG. 9 shows an example of a wireless communication system where techniques in accordance with one or more embodiments of the present technology can be applied. A wireless communication system 900 can include one or more base stations (BSs) 905a, 905b, one or more wireless devices 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies. In some embodiments, the base stations 905a, 905b may be configured to implement some techniques described in the present document. The wireless devices 910a to 910d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 10:
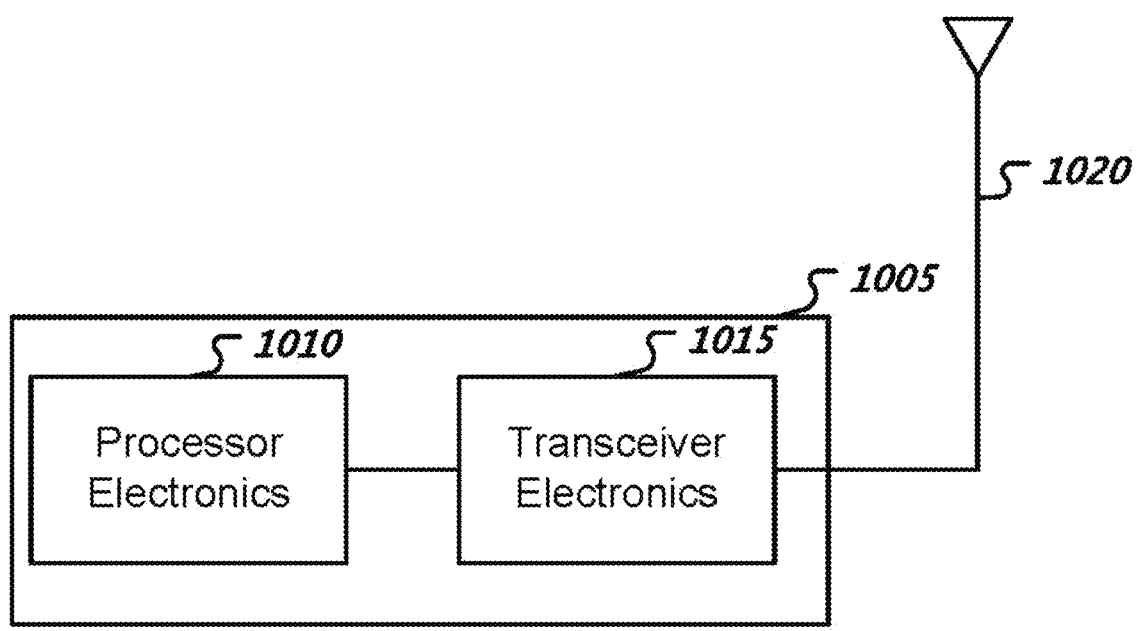
FIG. 10 is a block diagram representation of a portion of a hardware platform.

FIG. 10 is a block diagram representation of a portion of a hardware platform. A hardware platform 1005 such as a network device or a base station or a wireless device (or UE) can include processor electronics 1010 such as a microprocessor that implements one or more of the techniques presented in this document. The hardware platform 1005 can include transceiver electronics 1015 to send and/or receive wired or wireless signals over one or more communication interfaces such as antenna 1020 or a wireline interface. The hardware platform 1005 can implement other communication interfaces with defined protocols for transmitting and receiving data. The hardware platform 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions and network nodes are implemented using the hardware platform 1005.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for wireless communication, comprising:
    transmitting, by a first terminal, capability information associated with the first terminal to a second terminal, the capability information associated with the first terminal relating to a capability of the first terminal to directly communicate with a second terminal, so that the second terminal is configured to send the capability information associated with the first terminal received from the first terminal to a communication node, wherein the capability information associated with the first terminal is sent to the communication node via a sidelink terminal information message, and the capability information includes supported modulation and demodulation orders.

2. The method of claim 1, wherein the first terminal transmits the capability information associated with the first terminal upon receiving a capability enquiry from the second terminal.

3. The method of claim 2, wherein the capability enquiry includes a capability request filter.

4. The method of claim 1, wherein the capability information includes an indication of supporting out-of-order delivery.

5. The method of claim 1, wherein the capability information includes an indication of supporting radio link control (RLC) acknowledged mode (AM) SN.

6. The method of claim 1, wherein the capability information includes an indication of supporting RLC unacknowledged mode (UM) SN.

7. An apparatus for wireless communication comprising a processor that is configured to carry out the method of claim 1.

8. A non-transitory computer readable medium having code stored thereon, the code when executed by a processor, causing the processor to implement the method of claim 1.

9. A method for wireless communication, comprising:
    receiving, by a second terminal, capability information associated with a first terminal from the first terminal, the capability information associated with the first terminal relating to a capability of the first terminal to directly communicate with the second terminal; and
    transmitting, by the second terminal, the capability information associated with the first terminal received from the first terminal to a communication node, wherein the capability information associated with the first terminal is sent to the communication node via a sidelink terminal information message
    wherein the capability information includes supported modulation and demodulation orders.

10. The method of claim 9, wherein the capability information includes an indication of supporting out-of-order delivery.

11. The method of claim 9, wherein the capability information includes an indication of supporting radio link control (RLC) acknowledged mode (AM) SN.

12. The method of claim 9, wherein the capability information includes an indication of supporting RLC unacknowledged mode (UM) SN.

13. An apparatus for wireless communication comprising a processor that is configured to carry out the method of claim 9.

14. A non-transitory computer readable medium having code stored thereon, the code when executed by a processor, causing the processor to implement the method of claim 9.

* * * * *